United States Patent [19]
Obata et al.

[11] Patent Number: 5,426,288
[45] Date of Patent: Jun. 20, 1995

[54] BAR CODE READER AND READING METHOD USING SINGLE LASER LIGHT SOURCE FOR BOTH READING INFORMATION AND MEASURING DISTANCE

[75] Inventors: Kenzo Obata, Okazaki; Katsunori Goto, Handa, both of Japan

[73] Assignee: Nippondenso Co., Ltd., Kariya, Japan

[21] Appl. No.: 125,226

[22] Filed: Sep. 23, 1993

[30] Foreign Application Priority Data

Sep. 28, 1992 [JP] Japan .................................. 4-258295
Jun. 7, 1993 [JP] Japan .................................. 5-136152

[51] Int. Cl.$^6$ ............................................................. G06K 7/10
[52] U.S. Cl. ............................................ 235/462; 235/455; 235/470
[58] Field of Search .................. 235/462, 467, 455, 470, 235/472, 463, 466, 454; 250/568

[56] References Cited

U.S. PATENT DOCUMENTS

| | | | |
|---|---|---|---|
| 4,639,606 | 1/1987 | Boles et al. | 235/462 X |
| 4,792,666 | 12/1988 | Cherry et al. | 235/462 |
| 4,877,949 | 10/1989 | Danielson et al. | 235/462 |
| 4,920,255 | 4/1990 | Gabeler | 235/472 X |
| 5,177,343 | 1/1993 | Takenaka | 235/455 X |
| 5,179,286 | 1/1993 | Akasu | 250/561 X |
| 5,216,230 | 6/1993 | Nakazawa | 235/462 |
| 5,248,871 | 9/1993 | Takenaka | 235/462 |
| 5,260,554 | 11/1993 | Grodevant | 235/462 |

FOREIGN PATENT DOCUMENTS

| | | |
|---|---|---|
| 2115992 | 4/1990 | Japan . |
| 2259977 | 10/1990 | Japan . |
| 4232581 | 8/1992 | Japan . |
| 4313173 | 11/1992 | Japan . |

Primary Examiner—Donald Hajec
Assistant Examiner—Karl D. Frech
Attorney, Agent, or Firm—Cushman, Darby & Cushman

[57] ABSTRACT

An optical information reading method and device which prevents the generation of erroneous reading by specifying a reliable reading range for a bar code or like information. A microcomputer calculates the distance between the position of reflection of laser light from the bar code and a position at which the same laser light enters the scanning unit based on a time difference between the emission of the laser light and the reception of the reflected laser light. The microcomputer determines, through the calculation process, that the bar code is present within the suitable reading range only when the calculated distance is determined to be within the set reading range, and permits the scanning of the bar code.

15 Claims, 8 Drawing Sheets

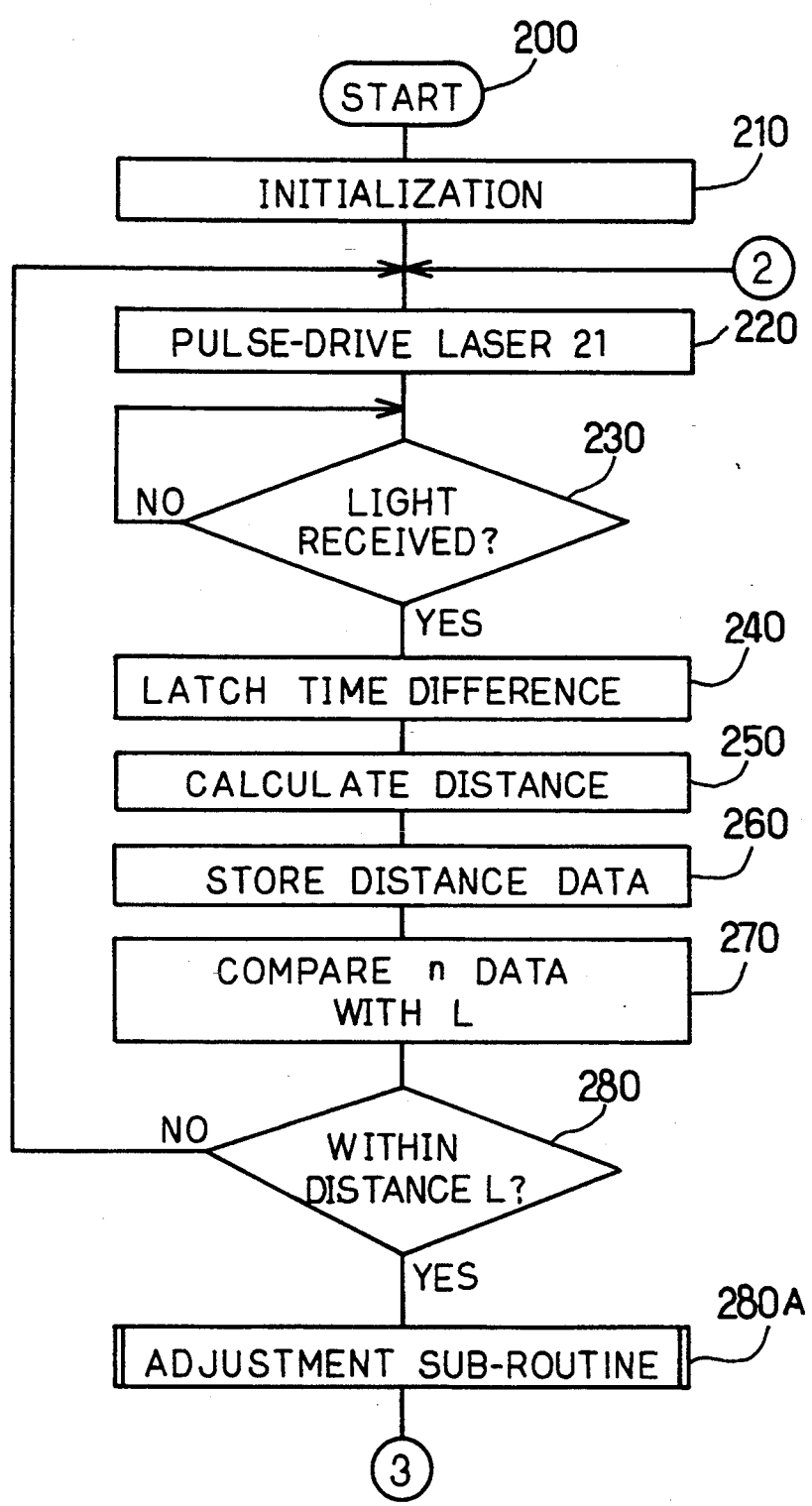

BAR CODE READER AND READING METHOD USING SINGLE LASER LIGHT SOURCE FOR BOTH READING INFORMATION AND MEASURING DISTANCE

BACKGROUND OF THE INVENTION

1. Field of the Invention

The present invention relates to an optical information reading method and device for optically scanning bar codes and like information via a laser beam emitted from a laser light source, and more specifically relates to an optical reading method and device suitable for scanning a bar code and like information via a downwardly directed laser beam.

2. Description of the Related Art

Conventional laser bar code readers of the installed type such as, for example, Spectra-Physics, Inc. (U.S.A.) model 750SL, and Nippondenso model BLS-1000, have a reader unit with a built in laser light source, a scanning unit and a reader unit arranged directly above the register counter of a supermarket or the like via a column support. A laser beam emitted from the laser light source of the scanning unit is emitted downwardly from a window on the bottom side of the unit and scans the bar code of the merchandise to accomplish a reading of the bar code information.

In laser bar code readers of the aforesaid construction, the laser beam for scanning the bar code of the merchandise is emitted downwardly from a window formed on the bottom side of the unit, as previously described, such that the bar code reading operation is readily accomplished on the register counter. Furthermore, such a bar code reader is safe because the laser beam is situated so as to not directly enter the eyes of an operator.

This advantage, however, also produces certain disadvantages because the laser beam is emitted downwardly, the disadvantages being described hereinafter. Normally, an operator removes the merchandise from the shopping basket disposed in proximity to the laser bar code reader on the register counter by a shopper, and after the bar code of said merchandise is read via scanning by the laser beam of the bar code reader, the merchandise is placed in another shopping basket on the register counter. It happens that sometimes the bar code of merchandise remaining in the shopping basket placed by a shopper and the bar code of merchandise already read and placed in the other shopping basket are scanned so as to be read together by the laser beam. Such a situation is disadvantageous inasmuch as the bar codes of the merchandise are duplicated, and the operator must perform an operation to correct the duplicated reading.

It has been considered that in order to prevent the aforesaid duplicate reading of the merchandise bar code, light having a wavelength near the wavelength of the laser beam should be directed toward the bar codes of the merchandise accommodated in the baskets. However, the aforesaid arrangement has certain disadvantages inasmuch as it requires an adequate light source to produce the aforesaid light having another wavelength, it requires more electrical power for said light source, and it is disadvantageous in terms of limitations to the location of installation.

SUMMARY OF THE INVENTION

The present invention eliminates the previously described disadvantages by providing an optical information reading method and device which prevents reading errors before they occur by specifying a reliable reading range of bar code information or the like.

In the optical information reading method and device of the present invention, an optical scanning means scans the information medium via a laser beam emitted from a laser beam emitting means, and in conjunction therewith, a measuring means measures the time period from the emission of the laser beam by the laser beam emitting means until the laser beam is reflected by the information medium and received by the photoreceptor means. When the determination means determines that the information medium is within a suitable reading range based on the aforesaid time period measured by the measuring means, the processing means executes a process to permit the reading of the information medium by the reading means. On the other hand, when the determination means determines that the information medium is not within a suitable reading range based on the aforesaid time period measured by the measuring means, the processing means executes a process to prohibit the reading of the information medium by the reading means.

Accordingly, when an operator places, for example, a shopping basket received from a shopper on the counter upon which the present invention is installed and the merchandise accommodated within the shopping basket is removed therefrom so as to read the bar code information or the like provided on the merchandise via laser beam scanning, the determination means may determine, in conjunction with the aforesaid scanning, that the aforesaid information is not within the suitable reading range based on the time period measured by the measuring means even though the bar code information or the like provided on the merchandise is scanned via the laser beam. Therefore, the reading of the bar code or like information read by the reading means is prohibited by the processing means. This prohibition results in preventing reading errors when reading the bar code or like information provided on merchandise accommodated in the shopping basket, and preventing duplicate readings which need correction operations relating to the duplicate readings. Therefore, only the bar code or like information provided on the merchandise removed from the shopping basket is normally correctly read. Furthermore, the effectiveness of the aforesaid operation makes it unnecessary to provide additional structural elements, i.e., makes dependence on other laser beams unnecessary, and since the laser beam which scans the bar code or like information medium is used in a direct application, there is no limitation on the installation of the device of the present invention.

BRIEF DESCRIPTION OF THE DRAWINGS

FIG. 9 is a flow chart showing the first stage operation of the microcomputer 150 of the second embodiment of the invention.

DESCRIPTION OF THE PREFERRED EMBODIMENTS

First Embodiment

Figure 1:
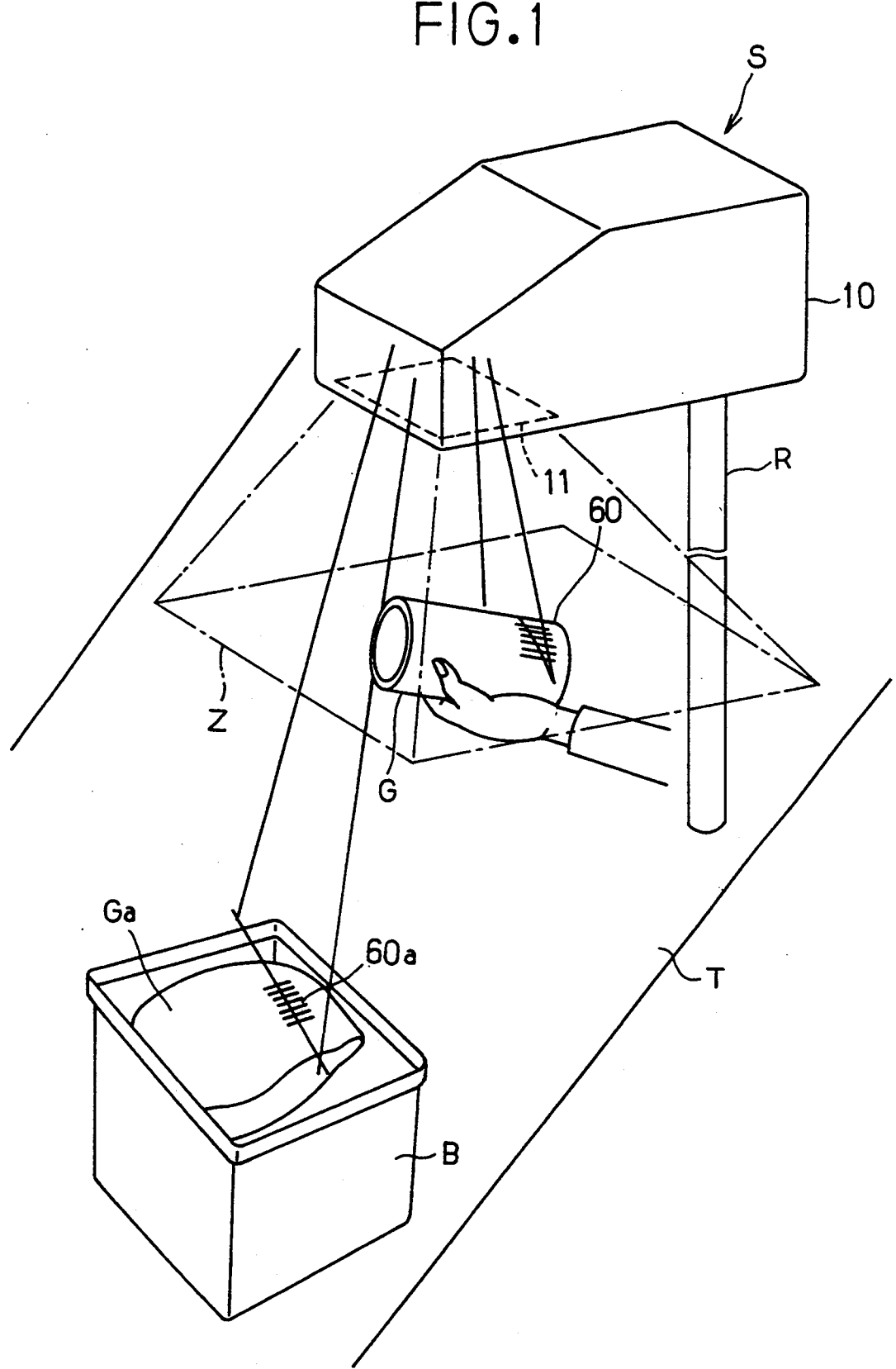
FIG. 1 is a perspective view showing the installation of the optical information reading device of the present invention.
Figure 2:
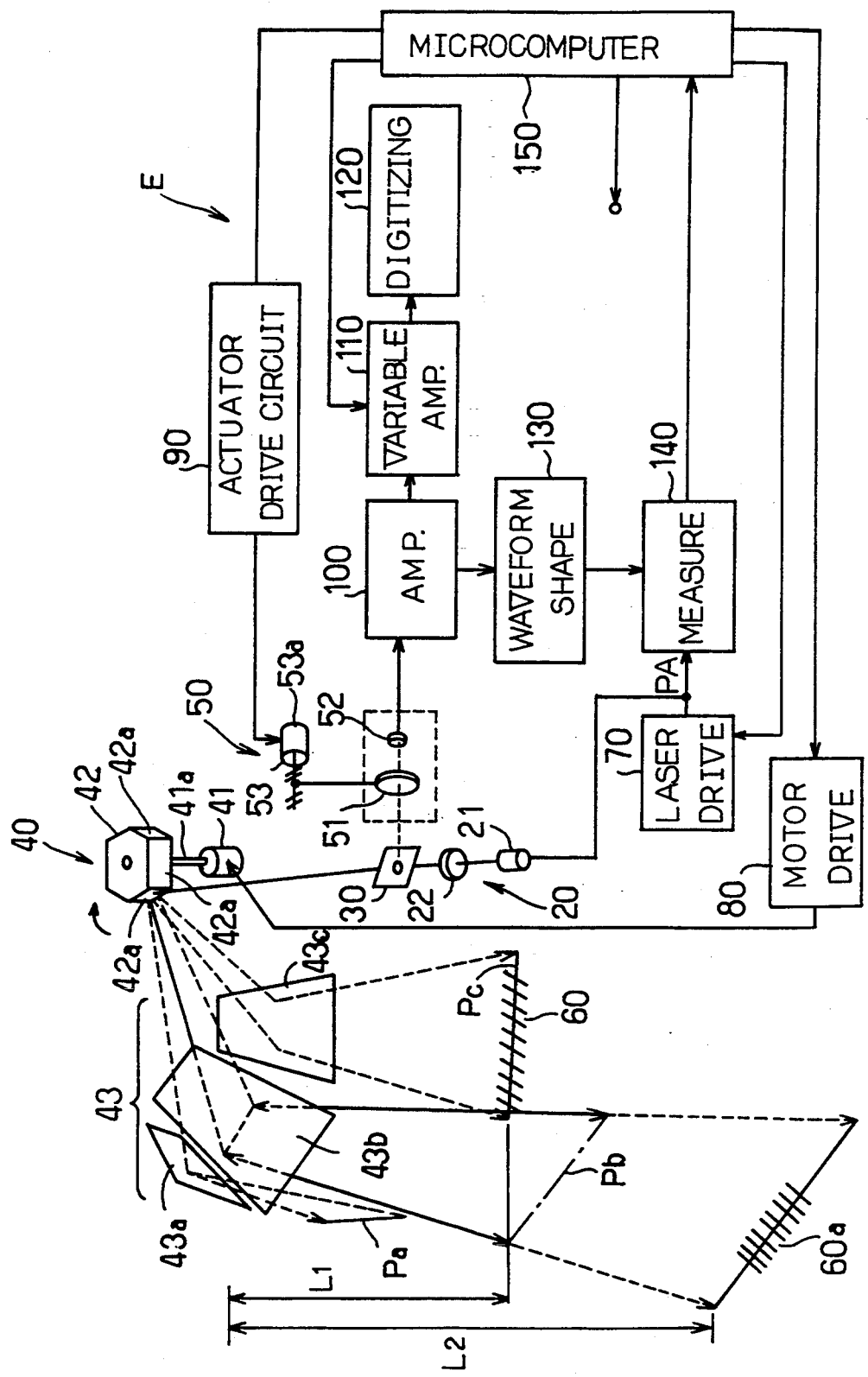
FIG. 2 is a brief exploded view of the interior of the device of the present invention and an electrical circuit diagram of the same.

A first embodiment of the present invention is described hereinafter with reference to the accompanying drawings. FIGS. 1 and 2 show the optical information reader of the present invention. As shown in FIG. 1, the optical information reader comprises a main unit S supported on an installation platform T by means of a support column R. The main unit S is provided with a casing 10 mounted on the upper end of the support column R, and at the front end of the bottom surface of the casing 10 is provided a light projection aperture 11 for projecting a laser beam downwardly in the manner known well in the art.

As shown in FIG. 2, the aforesaid optical information reader further comprises a photoemitting unit 20, pinhole mirror 30, scanning unit 40, and photoreceptor unit 50 disposed within the aforesaid casing 10. The photoemitting unit 20 further comprises a laser light source 21 and a collimating lens 22. The laser light source 21 may be, for example, a semiconductor laser diode, which sequentially emits laser beams toward the collimating lens 22. The collimating lens 22 collimates each laser beam emitted from the laser light source 21, and directs the collimated laser beam through the aperture of the pinhole mirror 30 so as to be transmitted to the scanning unit 40.

The scanning unit 40 comprises a direct current (DC) motor 41, polygonal mirror 42, and pattern mirror group 43. The DC motor 41 is provided with a rotating shaft 41a extending vertically upward relative to said DC motor 41 within the casing 10, and said DC motor 41 rotates in the arrow direction indicated in FIG. 2. The polygonal mirror 42 is coaxially supported by the rotating shaft 41a of the DC motor 41. As the polygonal mirror 42 is rotated in the same direction as the DC motor 41, the laser beam transmitted through the pinhole mirror 30 impinges the hexagonal facet of the various mirror surfaces 42a of the polygonal mirror 42, and is reflected therefrom to the pattern mirror group 43.

The pattern mirror group 43 comprises three pattern mirrors 43a, 43b and 43c arranged at mutually dissimilar angles of inclination perpendicular to the light projection aperture 11 of the casing 10 so as to confront said light projection aperture 11 and one among the various mirror surfaces 42a of the polygonal mirror 42. The pattern mirror group 43 sequentially receives and reflects the reflected laser beams from the various mirror surfaces 42a of the polygonal mirror 42 via the respective pattern mirrors 43a, 43b and 43c, so as to sequentially form the scan lines Pa, Pb and Pc which are projected downwardly through the light projection aperture 11. The scan lines Pa, Pb and Pc are generated so as to be continuously repeated via the rotation of the polygonal mirror 42, thereby creating an operating pattern having scan lines intersecting in three directions. When a bar code disposed below the light projection aperture 11 is scanned via the scan lines Pa, Pb and Pc, the laser light reflected from said bar code (hereinafter referred to as "bar code laser light") returns therefrom to impinge the pinhole mirror 30 in a time period equal to the laser emission time period. The majority of the bar code laser light which impinges the pinhole mirror 30 is reflected therefrom to the photoreceptor unit 50.

The photoreceptor unit 50 comprises a photoreceptor condenser lens 51 and photosensor 52 arranged on mutually identical optical axes, and a lens moving mechanism 53 for moving the condenser lens 51 along the direction of the optical axis. The condenser lens 51 sequentially condenses the various bar code laser light reflected by the pinhole mirror 30, and directs the condensed light to the photosensor 52. The photosensor 52 sequentially detects the condensed bar code laser light received from the condenser lens 51, and sequentially generates pulse-like indications of the intensity of the received light in the form of light intensity signals. The lens moving mechanism 53 has a linear actuator 53a which is connected via a rod to the aforesaid condenser lens 51 so as to move the condenser lens 51 along its optical axis. The linear actuator 53a moves the condenser lens 51 along its optical axis in accordance with the amount of movement of the aforesaid connecting rod.

Figure 4:
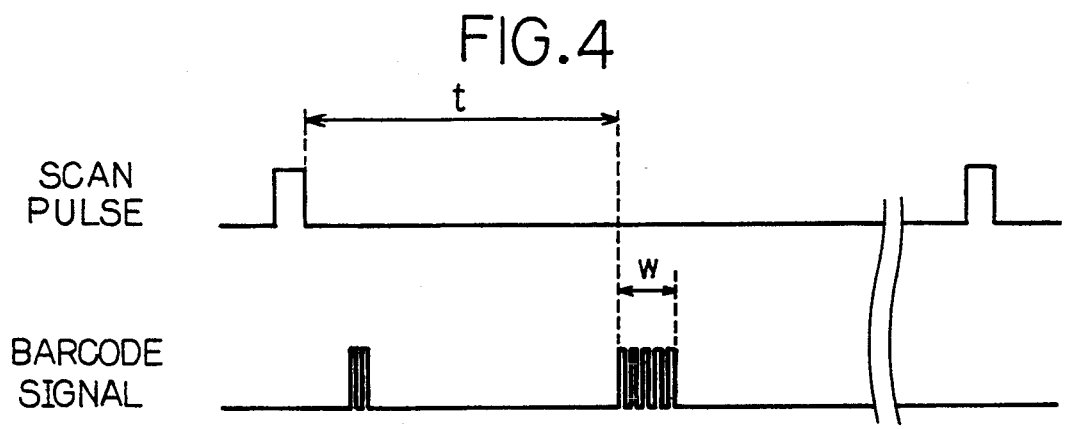
FIG. 4 is a waveform diagram showing the scan origin pulse and bar code signals.
Figure 5:
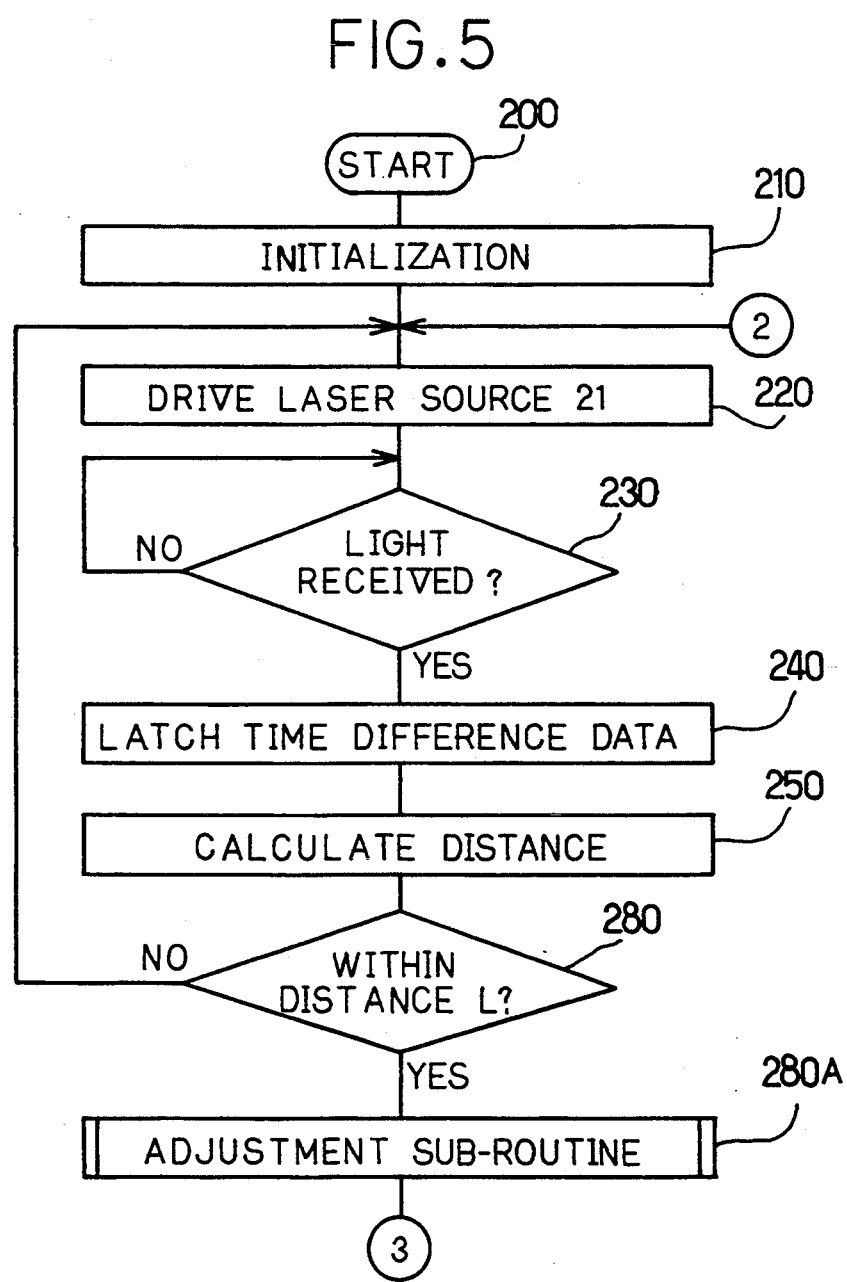
FIG. 5 is a flow chart of the first stage operation of the microcomputer 150 of FIG. 2.

Each time the scan process is repeated, a scan origin pulse is generated by an optical sensor (not illustrated) to indicate the scanning starting point (refer to FIG. 4).

The construction of the electrical control circuit E of the optical information reader of the present invention is described hereinafter with reference to FIG. 2. The laser drive circuit 70 is controlled by the previously mentioned microcomputer 150, and sequentially outputs drive pulses PA to the laser light source 21 so as to actuate said laser light source 21 for pulse emission. This means that a pulse-like laser beam is sequentially emitted from the laser light source 21 in response to each drive pulse PA output by the laser drive circuit 70.

Pursuant to controls executed by the aforesaid microcomputer 150, the laser drive circuit 70 outputs DC drive signals of predetermined levels to drive the continuous emissions of the laser light source 21. This means that laser light is continuously emitted by the laser light source 21 in response to DC drive signals output from the laser drive circuit 70.

The motor drive circuit 80 is controlled by the aforesaid microcomputer 150, and outputs motor drive signals to rotate the DC motor 41 at constant speed in the same direction. The actuator drive circuit 90 is controlled by the aforesaid microcomputer 150, and outputs actuator drive signals required to drive the linear actuator 53a so as to move the operating rod of the linear actuator 53a.

The amplification circuit (AMP circuit) 100 sequentially amplifies the light intensity signals transmitted from the photosensor 52, and generates corresponding AMP signals. The variable amplification circuit (variable AMP circuit) 110 sequentially variably amplifies each amplified signal transmitted from the AMP circuit 100, and outputs the variably amplified signals to the digitizing circuit 120 in accordance with the calculated amplification factor discussed later and pursuant to the control of the microcomputer 150. The variable AMP circuit 110 has an amplification control element such as a transistor or the like, and the degree of amplification of the variable AMP circuit 110 is controlled in accordance with the amount of control exerted by the amplification control element. The digitizing circuit 120 sequentially digitizes the variably amplified signals transmitted from the variable AMP circuit 110, and generates binary signals which are output to the microcomputer 150. The waveform shaping circuit 130 shapes the waveform shape of the amplified signals transmitted from the AMP circuit 100, and sequentially outputs shaped waveform signals to the measuring circuit 140.

Figure 3:
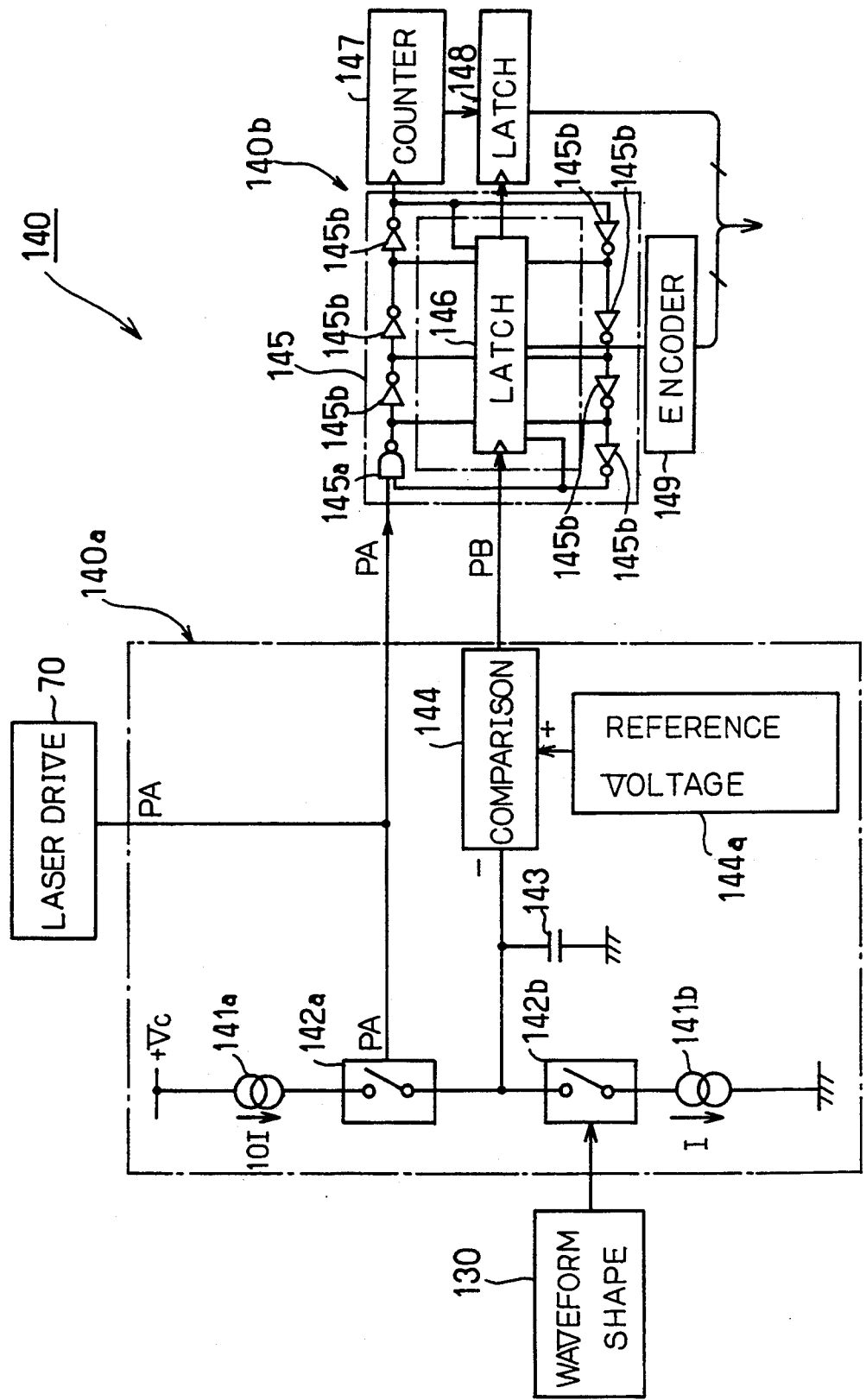
FIG. 3 shows circuit details of the measuring circuit 140 of FIG. 2.

As shown in FIG. 3, the measuring circuit 140 comprises a pulse extension circuit 140a connected to the laser drive circuit 70 and the waveform shaping circuit 130, and a time measuring circuit 140b connected medially to the pulse extension circuit 140a and the microcomputer 150. The pulse extension circuit 140a comprises a pair of constant-current power sources 141a and 141b which form a charging/discharging circuit, a pair of normally open analog switches 142a and 142b, and a condenser 143. The constant current power source 141a receives a DC voltage +Vc from the DC power source, and supplies a constant current 10I to the analog switch 142a. The constant current 10I expresses a ten-fold increase of the constant current I.

The analog switch 142a closes in response to a rise in the drive pulse PA transmitted from the laser drive circuit 70, so as to supply the constant current 10I from the constant-current power source 141a to the condenser 143. The condenser 143 is charged by the input constant-current 10I, and generates a condenser voltage. The analog switch 142b closes in accordance with a rise of each square wave signal transmitted from the waveform shaping circuit 130, and discharges the condenser 143. This means the analog switch 142b directs the discharge current supplied form the condenser 143 to the constant-current power source 141b, and the condenser voltage is reduced. The constant-current power source 141b receives the discharge current from the analog switch 142b, and supplies the constant-current I to the ground. This means the constant-current power source 141b discharges the condenser 143 via the constant-current I. On the other hand, the charge current supplied to the condenser 143 is ten-fold greater than the discharge current of said condenser 143, i.e., the time required to move the load by discharging the condenser 143 is ten-fold greater than the time required to charge the condenser 143.

The pulse extension circuit 140a further comprises a reference voltage generator 144a, and a comparison circuit 144; the reference voltage generator 144a generates a reference voltage Vref=0 (V). The comparison circuit 144 compares the condenser voltage from the condenser 143 with the reference voltage Vref from the reference voltage generator 144a. When the condenser voltage is higher than the reference voltage Vref, the comparison circuit 144 generates a low level comparison signal. When the condenser voltage achieves the reference voltage Vref, the comparison circuit 144 generates a high level comparison signal, which is output to the time measuring circuit 140b as a latch timing signal PB required by time measuring circuit 140b. Thus, after one drive pulse PA is output from the laser drive circuit 70, i.e., after one pulse-like laser emission from the laser light source 21, the time for the generation of one light intensity signal from the photosensor 52, i.e, the time until the generation of a single latch timing signal PB from the comparison circuit 144, is compared to the current time in connection to the charging/discharging operation of the comparison circuit 144.

As shown in FIG. 3, the time measuring circuit 140b is provided with a ring gate delay circuit 145 which is formed by a ring-like connection of the NAND gate 145a and seven individual inverters 145b. In this ring gate delay circuit 145, when single drive pulses PA transmitted from the laser drive circuit 70 are input to the NAND gate 145a, the NAND gate 145a and each inverter 145b generate sequential delay pulses. That is, since the delay time of each inverter 145b is extremely short, the delay time of each the inverters 145b is set to the minimum resolvability of the circuit 140b. In the present embodiment in which the circuit is manufactured by a 1.5 ($\mu$m) rule C-MOS process, the minimum resolvability is 500 (psec) to 1 (nsec). Thus, the distance resolution is equivalent to 15 (cm) to 30 (cm) since the speed of the laser beam is $3 \times 10^8$ (m/sec). Accordingly, if there is agreement with the extension degree of the previously described pulse extension circuit 140a, the minimum resolvability of the lock circuit 140b allows ten-fold resolvability of the delay time of each inverter 145b, such that the distance resolvability is 1.5 (cm) to 3 (cm).

The latch 146 responds to the single latch timing signal PB generated by the comparison circuit 144 after a single drive pulse PA generated by the laser drive circuit 70 is input to the NAND gate 145a, so as to latch each delay pulse of each inverter 145b and the NAND gate 145a of the ring gate delay circuit 145. The latched data of the latch 146 expresses whether or not a single drive pulse PA input to the NAND gate 145a has arrived at a specific inverter 145b, i.e., the portion of time remaining in a single cycle of a single drive pulse PA relative to the ring gate delay circuit 145 in the time difference between the input time of a single drive pulse PA to the NAND gate 145a and the subsequent input time of a single latch timing signal PB to the latch 146.

The cycle counter 147 counts each delay pulse sequentially produced by a single inverter 145b of the ring gate delay circuit 145, and outputs to the latch 148 the numerical data expressing the number of times a single input drive pulse PA is input to the NAND gate 145a of the ring gate delay circuit 145. The latch 148 responds to the input of the latch timing signal PB to the latch 146, and outputs as latch data the numerical data from the cycle counter 147 output in response to the latch timing signal generated by the same latch 146. The encoder 149 encodes the latch data from the latch 146, and outputs the latch data as encoded data. Thus, both output data from the latch 148 and the encoder 149 are output to the microcomputer 150 as time difference data expressing the input time of the single drive pulse PA sent to the NAND gate 145a, and the input time of the single latch timing signal PB sent to the latch 146.

The microcomputer 150 executes the computer program via the cooperative operation of the digitizing circuit 120 and the measuring circuit 140 in accordance with the flow charts of FIGS. 5 through 9. During program execution, the laser drive circuit 70, the motor drive circuit 80, and the actuator drive circuit 90 are controlled, and the calculation processes required for data output are executed. The aforesaid computer program is stored in the read only memory (ROM) of the microcomputer 150.

In the present embodiment of the invention constructed as previously described, the device enters the operating state via the operation of the power switch (not illustrated), whereupon, the microcomputer 150 starts executing the computer program of step 200 in accordance with the flow charts of FIGS. 5 through 9. The initialization process is executed in step 210, and the motor drive signals are output to the motor drive circuit 80. In step 220, the drive pulses PA are sequentially output to the laser drive circuit 70 and the measuring circuit 140. At this time, the shopping basket B accommodating a plurality of merchandise is placed by the shopper on the installation platform T in proximity to the optical information reader main unit S (refer to FIG. 1).

When the laser drive circuit 70 sends a drive pulse to the laser power source 21 in accordance with a single drive pulse PA, a single pulse-like laser beam is emitted to the collimator lens 22. Then, the collimator lens 22 collimates the aforesaid single pulse-like laser beam, which passes through the aperture of the pinhole mirror 30 and impinges one of the facets 42a of the polygonal mirror 42. At this time, the polygonal mirror 42 is rotating integratedly with the DC motor 41 in the same direction therewith.

When a single drive pulse PA from the laser drive circuit 70 is input to the measuring circuit 140, the analog switch 142a is closed, and the constant-current power source 141a begins to supply a constant current 10I through the analog switch 142a to the condenser 143. Therefore, the condenser voltage of the condenser 143 begins to rise due to the aforesaid charging. When a single drive signal PA is input to the aforesaid measuring circuit 140, the drive signal PA begins sequential circulation to the NAND gate 145a and each inverter 145b of the ring delay circuit 145. During this signal circulation, the NAND gate 145a and each inverter 145b sequentially output delay pulses to the latch 146. The cycle counter 147 starts counting the number of delay pulses output from a single inverter of the ring delay circuit 145, i.e., starts counting the number of circulations of the single drive pulse PA in the ring drive circuit 145.

When the polygonal mirror 42 rotates and reflects the collimated pulse-like laser light from one facet 142a thereof such that the laser light is reflected to the pattern mirror group 43 in the direction of rotation, the laser light reflected by the polygonal mirror 42 is directed downward through the light projection aperture 11 via one of the three pattern mirrors 43a through 43c. At this time, if the operator removes the merchandise G from the shopping basket B and places the merchandise G directly beneath the light projection aperture 11, the laser light projected from the single pattern mirror through the projection aperture 11 impinges the bar code 60 of the merchandise G, thereby scanning the bar code 60 as shown in FIG. 1.

In the bar code scanning process, when the laser light reflected by the bar code 60, i.e., the bar code laser light, is reflected through the projection aperture 11 and impinges the single pattern mirror of the pattern mirror group 43, the bar code laser light is reflected by the same pattern mirror to a single facet 42a of the polygonal mirror 42. When the polygonal mirror 42 reflects the bar code laser light directed toward a single facet 42a thereof to the pinhole mirror 30 in concert with the rotation of the polygonal mirror 42, the bar code laser light is reflected by the pinhole mirror 30 and collimated by the collimator lens 51, and, thereafter, impinges the photosensor 52. Thus, the aforesaid photosensor 52 receives the collimated bar code laser light from the collimator lens 51, and generates a light intensity signal.

Then, the light intensity signal from the photosensor 52 is amplified as an amplified signal by the AMP circuit 100, the amplified signal is amplified as a variably amplified signal by the variable AMP circuit 110, and the variably amplified signal is digitized as a digitized signal by the digitizing circuit 120 and input to the microcomputer 150. The amplified signal from the AMP circuit 100 is subjected to waveform shape adjustment by the waveform shaping circuit 130, and is input to the measuring circuit 140 as a square wave signal. The analog switch 142b of the pulse extension circuit 140a closes in response to the rise of the square wave signal sent from the waveform shaping circuit 130, and the charging current of the condenser 143 begins to be supplied to the grounded side through the same analog switch 142b as a constant current I via the constant-current power source 141b. The pulse-like waveform of the laser beam emitted from the laser light source 21 is corrected via the waveform adjusting action of the waveform shaping circuit 130 even when degenerated during reception by the photosensor 52.

Thereafter, when the condenser voltage of the condenser 143 reaches zero [0] due to the completion of discharging, and the comparison is made by the comparison circuit 144 with the reference voltage Vref from the reference voltage generator 144a, a high level reference voltage is generated, and output as a single latch timing signal PB to the latch 146 of the time measuring circuit 140b. Then, in response to the same latch timing signal PB, the latch 146 latches the each delay pulse from the NAND gate 145a and each inverter 145b of the ring delay circuit 145, and at the same time the latch 148 latches the count data from the cycle counter 147. The encoder 149 encodes the latch data from the latch 146. Then, when the encoded data from the encoder 149 and the latch data from the latch 148 are output to the microcomputer 150 as time difference data expressing the time difference between the input time of the single drive pulse PA sent to the NAND gate 145a, and the input time of the single latch timing signal PB sent to the latch 146 thereafter. Since the latch timing signal PB is generated based on the square wave signal produced by the waveform adjustment of the waveform shaping circuit 130, the waveform of the same latch timing signal PB is maintained virtually as a square wave. Accordingly, the time measurement via the measuring circuit 140 is more precise.

When the digitized signal from the digitizing circuit 120 is input to the microcomputer 150 in the manner previously described, the microcomputer 150 determines [YES] to the query in step 230 in accordance with the determination that light has been received by the photoreceptor 52, and in step 240 the time difference data from the measuring circuit 140 are stored temporarily, whereupon the computer program advances to step 250. Then, in step 250, the microcomputer 150 calculates the distance between the bar code 60 and the laser light input position to the pattern mirror group based on the aforesaid timer difference data (refer to reference numeral L1 of FIG. 2). When the computer program advances to step 280, the microcomputer 150 makes a determination as to whether or not the calculated distance L1 is within a set distance range L. The set distance L expresses the specific distance of the suitable reading zone Z of the device of the present invention (refer to FIG. 2), and is stored beforehand in the ROM of the microcomputer 150. In the present stage, if the calculated distance L1 is within the set distance range L, the bar code 60 is determined to be within the suitable reading zone Z, and the microcomputer 150 determines [YES] to the query in step 280.

Figure 6:
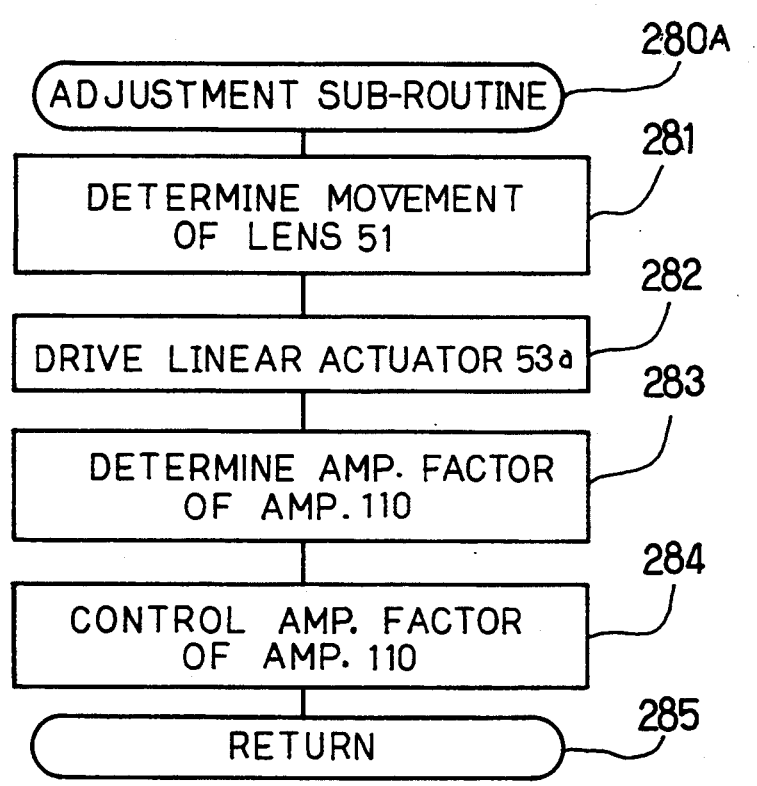
FIG. 6 is a flow chart showing the adjustment subroutine.
Figure 7:
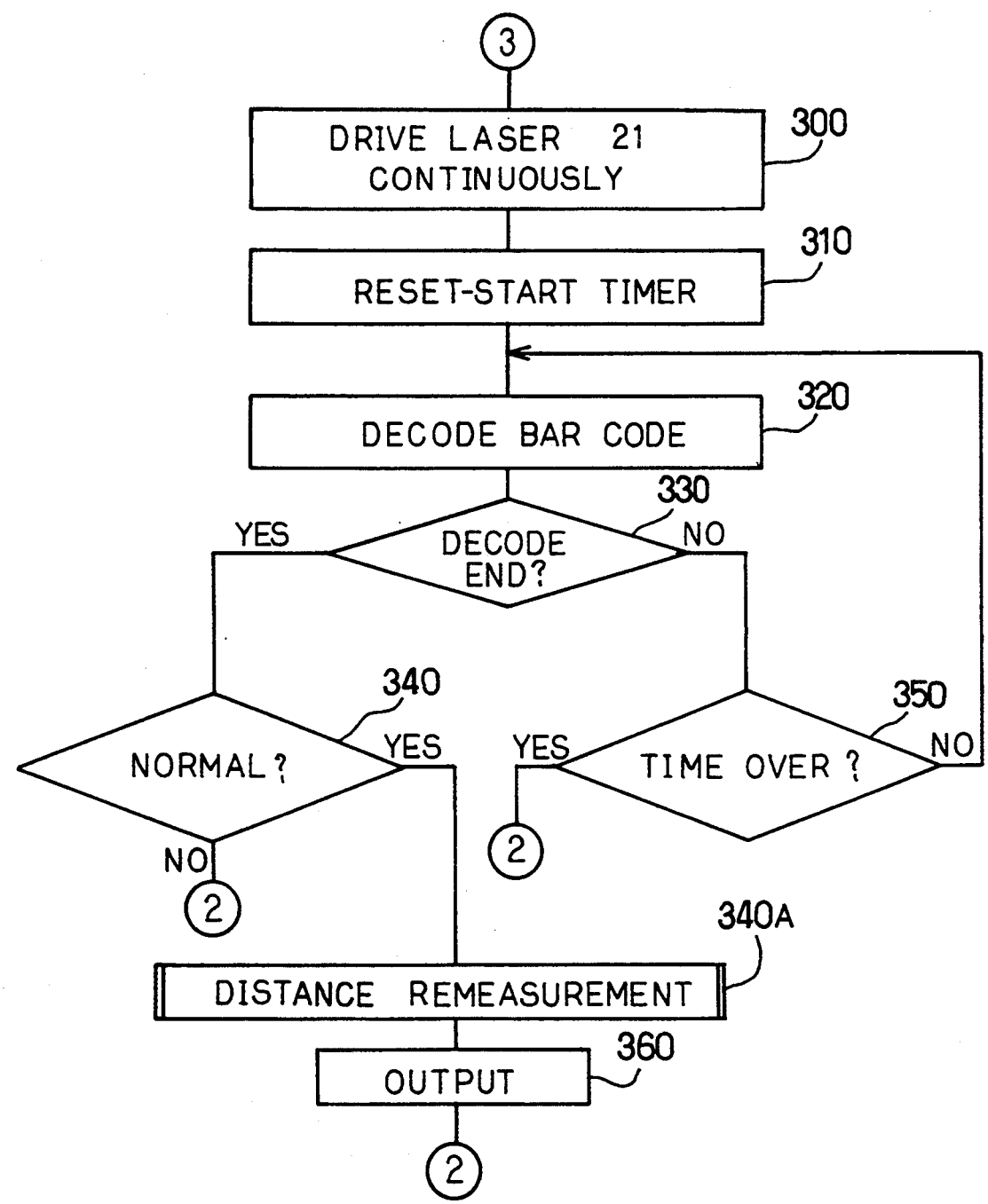
FIG. 7 is a flow chart showing the latter stage operation of the microcomputer 150 of FIG. 2.

When the determination to the query in step 280 is [YES], the program advances to the adjustment subroutine 280A based on the calculated distance L1, as shown in the flow chart of FIG. 6. In step 281, the target moving distance for the collimating lens 51 is determined to sharply focus the laser light collimated by the collimating lens 51 on the photoreceptor surface of the photoreceptor 52. In step 282, the determined target moving distance of the collimator lens 51 is output as an actuator drive signal to the actuator drive circuit 90. Therefore, the actuator drive circuit 90 drives the linear actuator 53a of the lens moving mechanism 53. Accordingly, the lens moving mechanism 53 moves the collimating lens 51 along its optical axis only by the aforesaid target moving distance in accordance with the change in the amount of movement of the operating rod of the linear actuator 53a. Thus, the collimated laser light from the collimating lens 51 which originated at the bar code 60 is sharply focused on the photoreceptor surface of the photoreceptor 52. This results in a satisfactory signal-to-noise (S/N) ratio of the light intensity signal from the photosensor 52, and higher resolvability of the optical system of the device of the present invention.

After the calculation process in step 282, the microcomputer 150, in the next step 283, determines the target amplification factor for the control of the amplitude control element of variable AMP circuit 110, so as to set the amplitude of the variable AMP circuit 110 at a value proportional to the calculated distance L1 of step 250. This means that the amplitude of the variable AMP circuit 110 is determined so as to compensate for the attenuation of the bar code laser light in accordance with the calculated distance L1. Thereafter, in step 284, the microcomputer 150 controls the amplification factor of the amplitude control element of the variable AMP circuit 110 pursuant to the determined target factor, and controls the amplification of the variable AMP circuit 110 at a value which is proportional to the calculated distance L1 of step 250. Thus, the variable amplified signal output from the variable AMP circuit 110 is set as the signal for correcting the attenuation of the bar code laser light in accordance with the calculated distance L1.

Thereafter, in step 300, the laser light source 21 is caused to continuously generate light via the laser drive circuit 70 in accordance with the DC drive signal transmitted from the microcomputer 150, the continuous laser light passing through the collimator lens 51 and pinhole mirror 30 toward the polygonal mirror 42.

As previously described, the laser beams emitted toward the polygonal mirror 42 are sequentially reflected by the individual facets 42a of the polygonal mirror 42, so as to sequentially impinge the individual pattern mirrors of the pattern mirror group 43, the laser beams being reflected from the pattern mirrors passing through the projection aperture 11, and emitted within the suitable reading zone Z. Thus, the bar code 60 is suitably scanned via one or another of the laser beams emitted within the suitable reading zone Z. As previously described, the bar code laser light reflected from the bar code in conjunction with the scanning passes through the pattern mirror group 43, polygonal mirror 42, pinhole mirror 30, and collimating lens 51, and is received by the photosensor 52, whereupon the photosensor 52 generates a light intensity signal. Since the collimating lens 51 is moved to a position corresponding to the target movement distance via the lens moving mechanism 53, the light intensity signal output from the photosensor 52 possesses a superior S/N ratio.

When the aforesaid light intensity signals from the photosensor 52 are amplified as amplified signals by the AMP circuit 100, and subsequently converted to variable AMP signals by the variable AMP circuit 110 which are output to the digitizing circuit 120, the signals are digitized by the digitizing circuit 120 and output to the microcomputer 150.

In step 310 (refer to FIG. 7), the computer program resets and starts the internal timer. In step 320, the microcomputer 150 executes the bar code decoding process in accordance with the aforesaid digitized signals. In the bar code decoding process, the width of each bar portion and the space portion of the bar code 60 are converted to numerical data based on the digitized signals, the bar code information of the bar code 60 is decoded by combining the various aforesaid numerical data, and output as restored decoded data.

If the bar code decoding process is completed within a predetermined time in step 320, the microcomputer 150 determines [YES] to the query in step 330, whereas if the bar code decoding process is not completed within a predetermined time in step 320, the microcomputer 150 determines [NO] to the query in step 330, and the computer program advances to step 350. When the reply to the query in step 340 is [NO], the computer program returns to step 220. Furthermore, when the reply to the query in step 330 is [NO], and if the set time of the aforesaid timer has not elapsed, the processes of step 320 and subsequent steps are executed again. On the other hand, if the set time of the aforesaid timer has elapsed, it is determined that the bar code is not within the scan pattern, the program returns to step 220, and the laser light source 21 is pulse driven. Thus, unnecessary continuous emission of the laser light source 21 is prevented.

Figure 8:
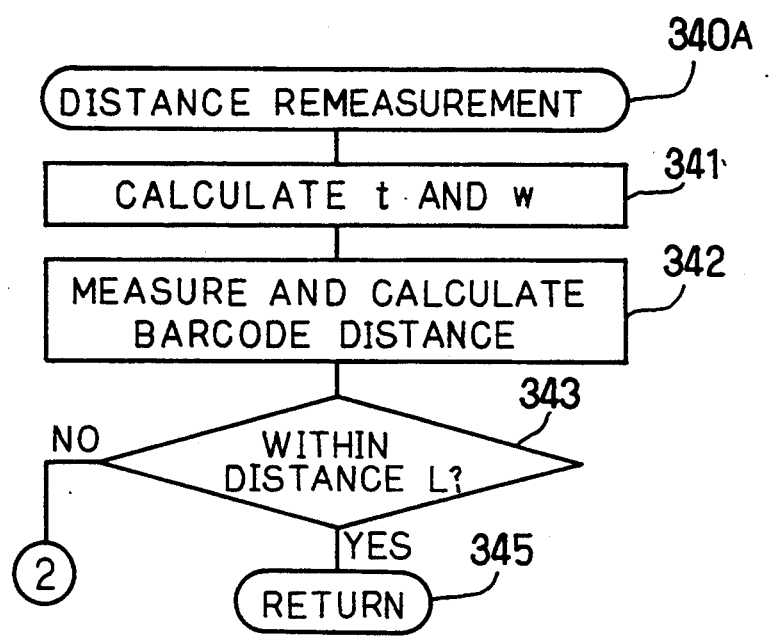
FIG. 8 is a flow chart showing the distance remeasurement subroutine.

If the determination in step 340 is [YES], the determination that a successfully decoded bar code is actually within the set distance L is re-verified in the distance re-measurement subroutine 340A shown in FIG. 8. This reverification process is similar to the measurement process performed before decoding. That is, the reverification process includes driving the single laser light source in order to project laser light, receiving laser light reflected from the bar code, measuring a distance to the bar code in response to the received reflected laser light, and validating the result. The reason for said re-verification is that when hand-held merchandise G is detected and its bar code scanned via continuous emission by the laser light source, it may occur that the bar code 60a of merchandise Ga in the shopping basket B is erroneously scanned, as shown in FIG. 1. In step 341, the time difference t from the scan origin pulse (scan pulse) of the successfully decoded bar code signal, and the bar code signal width w are determined (refer to FIG. 4). Alternatively, the time difference from the scan origin pulse to the same bar code signal may be totaled and designated as t, and the width of the bar code signal may be totaled and designated as w. The position on the scan pattern of the same bar code signal can be specified by determining the time difference t from the scan origin pulse and the width w of the same bar code signal, so as to prevent erroneous reading of a bar code in the shopping basket by measuring the distance to the position.

Even when the merchandise is moved manually, the movement speed is standardly 800 m/sec or less. In the present example, the scan process is repeated and the cycle is 10 Hz. After the bar code is read and until the scan process completes a cycle and the distance is re-measured, the bar code moves only about 8 mm, which poses no problem from a practical viewpoint.

In step 342, if the pulse drive of the laser light source 21 is omitted from the time t after the scan origin pulse to the time w, the contents of the processes from step 220 through step 250 remain the same. In step 343 a determination is made as to whether or not the calculated distance is within the set distance L. If the calculated distance is within the set distance L, the routine moves to return step 345 and output step 360. When the calculated distance L2 of the bar code 60a or the like is determined to be not within the set distance L in step 343, the reading is nullified.

As previously described, the measuring circuit 140 uses laser light from the laser light source 21, i.e., the laser light for both scanning the bar code, and for the aforesaid time measurement for the distance calculation. When ultrasonic waves are used for distance measurement, the ultrasonic wave reflects the bar code as well as the operator's arm or the like, such that the reflection source is unclear, whereas, the distance measurement is usually accurate based on the laser light reflected from the bar code. Thus, the extra construction elements required to use ultrasonic waves are unnecessary, and dependence on other laser light is also unnecessary, such that there is no increase in cost or limitation placed on the location of installation of the device of the present invention. Since the high accuracy of the previously described distance measurement is used to control the moving distance of the collimator lens 51 and the amplification accomplished by the variable AMP circuit 110, the light intensity signal produced by the photosensor 52 possesses superior S/N ratio and resolvability, such that the reading precision is greatly improved by the device of the present invention.

It is to be understood that in the first embodiment, the distance measurement is determined via only a single distance measurement, but in a second embodiment, the distance measurement may be executed a plurality of times, and the final determination is made by means of the majority of the determination results as to whether or not the distance is within the reading range. More specifically, the results of distance measurements executed n times in previous continuous measurements are stored in memory, and the determination is made as to whether or not the distance is within the length L via the majority of the distance measurements. Thus, when merchandise bearing a bar code is present within a set distance L, laser light is continuously emitted and the bar code is read. After successful decoding, the distance to the bar code label is re-measured and the distance determination is made based on the majority of the measurement results so as to prevent erroneous reading of bar codes that are not within the set distance L.

The second embodiment of the invention is described hereinafter with reference to the flow chart of FIG. 9.

In the flow chart of FIG. 9, the steps from step 200 to step 250 are identical to the respective steps in the first embodiment, and the repeated explanations are therefore omitted.

After the distance is calculated based on the time difference data in step 250, the program advances to step 260. In step 260, the distance data are stored in the microcomputer 150, then the distance data are updated. Then, the program continues to step 270, wherein the distance data for n times previously stored in the microcomputer 150 are compared to the set distance L, then in step 280, a determination is made as to whether or not the measured distance is within the set distance L using the majority of the distance determination results of the aforesaid n times data. Thus, when the determination to the query of step 280 is [YES], then in step 300, the microcomputer 150 continuously drives the laser light source 21, and the DC drive signals and motor drive signals are respectively output to the laser drive circuit 70 and the motor drive circuit 80 to rotate the DC motor 41 in one direction. Steps subsequent to the aforesaid step 300 are identical to the respective steps of the first embodiment with the exception of the distance remeasurement subroutine of step 340A, wherein the previously described majority of distance measurements are used to make the determination.

When the determination to the query of step 280 is [NO], advancement of the computer program to step 300 and subsequent steps are prohibited, and bar code reading is not accomplished.

As previously described, the second embodiment minimizes the possibility of distance detection errors, thereby preventing erroneous continuous laser emission, and erroneous reading of bar codes not within the set distance, and provides the advantages of reducing the laser emission time, and lengthening the service life of the laser and the like.

In the embodiments of the method and device of the present invention, the output constant-current ratio of both constant-current power sources 141a and 141b of the measuring circuit 140 is not limited to the previously mentioned ten-fold factor, and may be modified to an optional value as needed. Thus, the present invention may be modified to an optional resolvability.

The embodiments of the method and device of the present invention may provide an alarm such as a beep sound or flashing light which alerts the operator when the bar code to be read is not placed within the suitable reading zone Z.

Although the calculated distances L1 and L2 were used in the amplification factor control of the variable AMP circuit 110 in the first and second embodiments, it is to be noted that alternatively the amplification factor control of the variable AMP circuit 110 may be accomplished in accordance with the light intensity detected by the photosensor 52. The device of the present invention is not limited to the optical information reader of the previously described first and second embodiments, insofar as the invention may be adapted to various types of optical information reading devices which read bar codes or the like by emitting laser light downwardly through a light projection aperture.

Although the first and second embodiments have been described in terms of a pinhole mirror 30 installed medially to a collimator lens 22 and a polygonal mirror 42, it is to be understood that the present invention is not limited to such an arrangement inasmuch as a half-mirror may alternatively be provided medially to the collimator lens and polygonal mirror instead of the aforesaid pinhole mirror.

What is claimed is:

1. An optical information reading device comprising:
   single laser light generating means for generating a single laser beam activatable to operate in a continuous form and in a pulse form;
   optical scanning means for scanning a laser-light-reflective information medium by projecting a laser beam emitted from said single laser light generating means;
   photoreceptor means for receiving laser light reflected from said information medium;
   reading means for reading information of said information medium based on an output of said photoreceptor means when said single laser light generating means is activated continuously;
   measuring means for measuring a time from a beginning of emission of said laser beam by said single laser light generating means until reception of the laser light reflected from said information medium is received by said photoreceptor means when said single laser light generating means is activated in said pulse form;
   determination means for determining if said information medium is within a suitable reading range based on said time measured by said measuring means; and
   processing means for permitting continuous activation of said single laser light generating means and said reading of information of said information medium by said reading means when said determination means determines that said information medium is within said suitable reading range, and for prohibiting continuous activation of said single laser light generating means when said determination means determines that said information medium is not within said suitable reading range.

2. An optical information reading method comprising the steps of:
   firstly driving a single laser light source in a short pulse form to project a pulsed laser beam toward a predetermined scanning zone in which a laser-light-reflective information medium to be scanned is placed;
   receiving by receiving means said pulsed laser beam reflected by said information medium;
   measuring a first distance between said single laser light source and said information medium effectively by measuring a time interval between a beginning of an emission of said pulsed laser beam from said single laser light source and said reception of said reflected pulsed laser beam by said receiving means;
   determining whether said first distance is within a predetermined distance;
   driving, when said determining step determines that said first distance is within said predetermined distance, said single laser light source continuously to project a continuous laser beam toward said predetermined scanning zone;
   scanning said information medium with said continuous laser beam;
   receiving by said receiving means said continuous laser beam reflected by said information medium;
   decoding information of said information medium represented by said continuous laser beam received by said receiving means; and
   disabling, when said determining step determines that said first distance is outside said predetermined distance, said single laser light source from continuously projecting said continuous laser beam.

3. A method according to claim 2, further comprising the step of: varying, in accordance with said first distance, a position of lens means disposed in front of said receiving means before driving said single laser light source continuously.

4. A method according to claim 2, further comprising the step of:
   varying, in accordance with said first distance, an amplification factor of amplifier means connected to said receiving means for amplifying said received laser beam.

5. A method according to claim 2, further comprising the steps of:
   secondly driving said single laser light source in a short pulse form after said decoding step;
   receiving by said receiving means the single laser beam projected by secondly driving said single laser light source in said short pulse form;
   measuring a second distance between said single laser light source and said information medium effectively by measuring a time interval between a beginning of an emission of said pulsed laser beam from said single laser light source and said reception of said reflected pulsed laser beam by said receiving means;
   validating said decoded information when said second distance is within said predetermined distance.

6. An optical information reading method comprising the steps of:
   firstly driving a single laser light source to project laser light toward a laser-light reflective information medium to be scanned;
   firstly receiving laser light reflected from said information medium;
   measuring a first distance to said information medium in response to said reflected first laser light;
   secondly driving said single laser light source to project laser light toward said information medium, when said first distance is within a predetermined range;
   secondly receiving laser light reflected from said information medium; and
   decoding information of said information medium in response to said secondly received laser light.

7. An optical information reading method according to claim 6, further comprising the steps of:
   thirdly driving said single laser light source to project a laser light, after said step of decoding information;
   thirdly receiving laser light reflected from said information medium;
   measuring a second distance to said information medium in response to said thirdly received laser light; and
   validating said decoded information when said second distance is within said predetermined range.

8. An optical information reading method according to claim 6, wherein said single laser source is operable in a continuous form and in a pulsed form, and wherein:
   said step of firstly driving said single laser source includes a step of driving said single laser source in a pulse form; and
   said step of secondly driving said single laser source includes a step of driving said single laser source in a continuous form.

9. An optical information reading apparatus comprising:
- a single laser light source operable in both continuous and pulsed forms for projecting a laser beam toward a laser-light reflective information medium;
- reading means for reading information of said information medium in response to laser light from said single laser light source and reflected from said information medium; and
- first distance measuring means for measuring a first distance between said laser light source and said information medium effectively, in response to laser light from said single laser light source and reflected from said information medium, said first distance measuring means controlling said reading means in response to said measured distance.

10. The optical information reading apparatus according to claim 9, further comprising second distance measuring means for measuring a second distance between said single laser light source and said information medium effectively, in response to laser light from said single laser light source and reflected from said information medium, said second distance measuring means being operable after said reading means reads information of said information medium.

11. An optical information reading apparatus according to claim 9, wherein:
- said single laser light source is operated in said continuous form when said reading means reads said information of said information medium; and
- said single laser light source is operated in said pulsed form when said first distance measuring means is measuring said first distance.

12. Optical information reading apparatus comprising:
- single laser light source switchable to produce either a pulsed laser light beam or a continuous laser light beam for projection of laser light onto an information medium;
- determining means for determining whether said information medium is within a predetermined distance range from said single laser light source when said single laser light source produces said pulsed laser light beam;
- means for switching said single laser light source to produce said continuous laser light beam only when said information medium has been determined by said determining means to be within said predetermined distance range from said single laser light source; and
- decoding means for reading information on said information medium by using said continuous laser light beam.

13. Optical information reading apparatus as in claim 12, further including means operative after said decoding means has read said information on said information medium for controlling said switching means to switch said single laser light source back to producing said pulsed laser light beam for operating said determining means to determine again whether said information medium is still within said predetermined range from said single laser light source.

14. An optical information reading method comprising the steps of:
- determining whether an information medium is within a predetermined distance range from a single laser light source by using pulsed emission of light from said single laser light source; and
- decoding information on said information medium by using continuous emission laser light from said single laser light source only after said information medium is determined to be within said predetermined distance range from said single light source.

15. The optical information reading method according to claim 14, further comprising an additional step of determining whether an information medium is still within a predetermined distance range from a single laser light source by using pulsed emission of light from said single laser light source after said step of decoding information.

* * * * *